Figure 1:
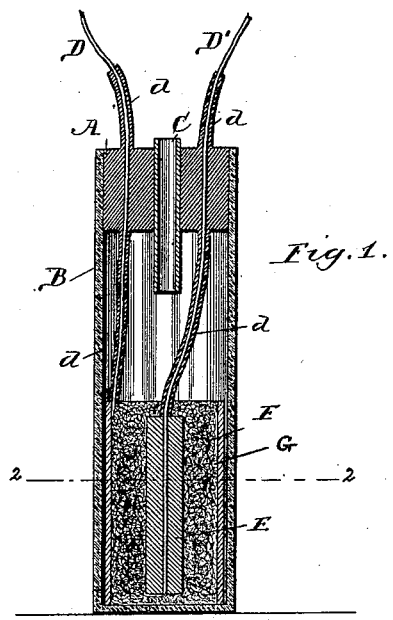

(No Model.)

F. H. ROOT.
GALVANIC BATTERY.

No. 470,792. Patented Mar. 15, 1892.

Witnesses
W. Rossiter
Fred? P. Mills

Inventor
Francis H. Root
By Chas. G. Page
Atty.

UNITED STATES PATENT OFFICE.

FRANCIS H. ROOT, OF CHICAGO, ILLINOIS.

GALVANIC BATTERY.

SPECIFICATION forming part of Letters Patent No. 470,792, dated March 15, 1892.

Application filed November 5, 1888. Serial No. 290,061. (No model.)

*To all whom it may concern:*

Be it known that I, FRANCIS H. ROOT, a citizen of the United States, residing at Chicago, in the county of Cook and State of Illinois, have invented a certain new and useful Improvement in Galvanic Primary and Secondary Batteries, of which the following is a specification.

In carrying out my invention I pack the battery-cell with mineral fiber—such as mineral wool, fibrous asbestos, or glass wool, or like mineral fiber—which will not be affected by any of the ordinary battery solutions. A body of such mineral fiber packed within the battery will hold the electrodes in position and provide between the same a sort of spongy or porous cushion, which readily absorbs and by capillary attraction holds within the battery such exciting-fluids as may be employed, thereby providing a simple and economical portable battery, which may be shipped without liability of the exciting-fluid becoming spilled out should the battery be tipped over during transportation. The constitution of such mineral fiber serves to permit it to be properly packed in the battery without becoming crushed to a solid or proximately solid condition, and by reason of the inherent elasticity of the mineral fibers the mass will retain its woolly condition and at the same time effectively serve to hold the electrodes in place. I find that such absorbent packing adds but very little resistance, since it allows the liquid excitant to freely circulate through its numerous interstices, whereby said packing far excels a packing having the density incident to a body of sand, earth, gelatine paste, or the like. The packing of mineral fiber forming a wooly mass also allows gas to escape from the plates or electrodes about as freely as in a battery having its electrodes simply immersed in a liquid solution, the escape of gas through the mass of mineral fiber being permitted by reason of the numerous interstices or spaces between the collected fibers. The packing of mineral fiber involves, therefore, a further advantage over earth, sand, gelatine paste, or the like, since said last-named materials will be apt to cause the collection of bubbles on the plates or electrodes, and thereby increase the resistance of the cell, while neither mineral wool, fibrous asbestus, nor glass wool will be affected by any ordinary battery solutions and will all last indefinitely. I prefer, however, of the three the article of commerce known as "mineral wool," which I find to possess certain properties that render its use in a battery more advantageous. Thus, although a suitable quantity of mineral wool may be filled into the cell and packed or rammed, the springy mass will invariably resume a porous condition, and hence resist such attempts to solidify or unduly compact it. The porous condition of the mass is therefore insured, and a packing provided having sufficiently large interstices to prevent the presence of the packing from materially adding to the resistance. I may observe that glass wool also forms an exceedingly elastic or springy mass which tends to resist undue compacting; but I prefer mineral wool on account of its exceeding cheapness, as well as for other reasons. I also provide in the battery-cell thus provided with a packing of mineral fiber a combination consisting of a zinc electrode, a chloride-of-silver electrode, and an excitant consisting of any caustic solution, such as caustic potash, caustic soda, or the like, but preferably caustic potash. I discover by experiment that a battery-cell containing said combination of elements gives a strong current for a short time and then polarizes, but that it will depolarize in a remarkably short period of time upon being left in open current.

The foregoing combination also permits the production of a battery of greater value than any other battery with which I am acquainted for service where it is necessary to provide a strong current for a given service and further desirable that the battery when polarized should rapidly recover itself, it being, for example, exceedingly desirable to provide a battery of such character for service in connection with call-bells, gas-lighting, or for testing-batteries or other purposes where the battery is to be left in open circuit, but when put to use to be used with a strong current. In this connection it may also be observed that said combination permits the provision of an exceedingly small but remarkably powerful battery, whereby a small but highly-efficient battery can be provided for occasions where the available space necessitates a battery of very small size. I have also discovered that the caustic solution with chloride of silver gives a stronger current than can be attained with any other excitant heretofore used with chloride of silver. As an illustration of the old art, sal-ammoniac has been used in connection with chloride of silver; but said combination of sal-ammoniac with chloride of silver (an electrode of zinc or its equivalent being understood to be present as a matter of course) will not give nearly as strong a current as I can obtain by the combination of caustic and chloride of silver. Among other differences in this connection it may be noted that a battery containing the combination of sal-ammoniac and chloride of silver will not only give a feebler current, but will continue to work until the chloride of silver has all been converted into silver, whereas a battery containing the combination of caustic and chloride of silver will for a certain time give a far more powerful current and then polarize.

My invention also relates to the stopper and the insulation of the wires within the battery-cell. In carrying out this part of my invention I propose providing any ordinary or suitable battery-cell with a rubber stopper, and also propose covering the wires with a rubber coating, which is practically integral with the stopper. As an illustration of such construction, reference is made to the accompanying drawings, wherein—

Figure 2:
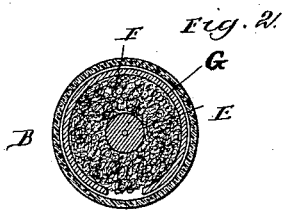

Figure 1 represents a section taken on a vertical plane centrally through a battery-cell. Fig. 2 is a section taken through Fig. 1 on line 2 2. Said Fig. 2, while not showing the stopper, serves to illustrate one of a variety of ways in which a packing of mineral fiber can be arranged.

The stopper A (shown in Fig. 1 fitted into the neck or upper end of any ordinary form of battery-cell B) is understood to be made of soft rubber in contradistinction to the article known as "hard rubber." This stopper may be and preferably is provided at its center with a small vent-tube C, which extends somewhat below the stopper.

The wires D and D' are each provided with a coating of rubber $d$, which is shown as in one piece with the rubber stopper. This I attain by first providing the rubber stopper with perforations somewhat larger than the previously rubber-coated wires, which latter can be introduced through such apertures to permit the rubber stopper to be fitted in place, after which the spaces between the coated wires and the walls of the perforations through the stopper can be filled in with rubber in soluble form. Such soluble rubber in hardening unites with the coatings of the wires and the rubber stopper, thereby practically forming the stopper and the coatings on the wires in one piece. Said construction provides a perfectly-tight joint, and hence avoids any possibility of a leakage of the solution at such point. In this connection it will be seen that the vent-tube extends downwardly into the space that is between the stopper and the electrodes, so that in case the cell should be tipped over leakage through the vent-tube will be avoided.

The chloride-of-silver electrode E is embedded within the packing F of mineral fiber, and this said packing is arranged within a cylindric zinc electrode G within the jar or cell B, the wire D being connected with the zinc electrode and the wire D' being embedded in the chloride-of-silver electrode.

What I claim as my invention is—

1. A battery comprising the cell B, closed at its top and provided with a vent-tube, a packing F of mineral fiber arranged within the cell, a chloride-of-silver electrode E, embedded within the packing, a zinc electrode surrounding the packing, and an excitant consisting of a caustic solution, substantially as set forth.

2. The combination, with a galvanic cell, of a rubber stopper and rubber-coated wires, the coatings of the wires and the rubber stopper being united as one piece.

3. The combination, with a galvanic cell, of a rubber stopper having a centrally-arranged vent-tube extending below the stopper into the cell and rubber-coated wires having their coatings united to the rubber stopper, such as described.

FRANCIS H. ROOT.

Witnesses:
CHAS. G. PAGE,
N. DICKINSON.